United States Patent
Kim et al.

(10) Patent No.: US 10,971,998 B2
(45) Date of Patent: *Apr. 6, 2021

(54) CHARGING APPARATUS FOR ELECTRIC VEHICLE

(71) Applicants: Hyundai Motor Company, Seoul (KR); Kia Motors Corporation, Seoul (KR)

(72) Inventors: Jongpil Kim, Gyeonggi-do (KR); Woo Young Lee, Gyeonggi-do (KR); Gyu Yeong Choe, Gyeonggi-do (KR); Hyun-Wook Seong, Gyeonggi-do (KR); JinYoung Yang, Gyeonggi-do (KR); Jung Hong Joo, Gyeonggi-do (KR); DongGyun Woo, Gyeonggi-do (KR); Dong Sup Ahn, Seoul (KR); Hyung Bin Ihm, Seoul (KR); Youngkook Lee, Seoul (KR); Jin Hwan Jung, Gyeonggi-do (KR); SeungHyun Han, Gyeonggi-do (KR); Sihun Yang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 240 days.

This patent is subject to a terminal disclaimer.

(21) Appl. No.: 16/214,936

(22) Filed: Dec. 10, 2018

(65) Prior Publication Data
US 2019/0312509 A1 Oct. 10, 2019

(30) Foreign Application Priority Data
Apr. 4, 2018 (KR) ........................ 10-2018-0039010

(51) Int. Cl.
*H02M 1/42* (2007.01)
*H02J 7/14* (2006.01)
(Continued)

(52) U.S. Cl.
CPC ........... *H02M 1/4233* (2013.01); *B60L 53/22* (2019.02); *H02J 7/022* (2013.01); *H02J 7/14* (2013.01); *H02M 1/4225* (2013.01)

(58) Field of Classification Search
CPC ............ H02J 7/14; H02J 7/22; H02M 1/4233; H02M 1/4225; B60L 53/22
(Continued)

(56) References Cited

U.S. PATENT DOCUMENTS 7,061,212 B2 * 6/2006 Phadke ............... H02M 1/4225
323/222
7,768,800 B2 * 8/2010 Mazumder .......... H02M 7/5387
363/17

(Continued)

FOREIGN PATENT DOCUMENTS

CN 101697656 A * 4/2010
CN 205901619 U * 1/2017

OTHER PUBLICATIONS

Dostal, "Easy to Use PFC Benefits Motor Control Applications", Analog Devices, Inc., 2014, 3 pages. (Year: 2014).*
(Continued)

*Primary Examiner* — Phallaka Kik
(74) *Attorney, Agent, or Firm* — Mintz Levin Cohn Ferris Glovsky and Popeo, P.C.; Peter F. Corless

(57) ABSTRACT

A charging apparatus for an electric vehicle is provided. The apparatus includes an AC power input terminal receiving one AC input power from among single-phase AC power and multi-phase AC power. A power factor corrector having full bridge circuits receives the AC input power through the AC power input terminal. A link capacitor is charged through the power factor corrector. A first switch connects any one of an AC power input line and a neutral line of the AC power input terminal to the power factor corrector and a second switch selectively connects the AC power input terminal to the power factor corrector, or the link capacitor. The power factor corrector and the switch network operate (Continued)

based on a condition of received AC input power. The second switch includes a third switch and a fourth switch that connect each full bridge circuit to a positive battery electrode.

14 Claims, 15 Drawing Sheets

(51) Int. Cl.
  *H02J 7/22* (2006.01)
  *B60L 53/22* (2019.01)
  *H02J 7/02* (2016.01)
(58) Field of Classification Search
  USPC .......................... 320/109, 104, 133, 138, 143
  See application file for complete search history.

(56) References Cited

U.S. PATENT DOCUMENTS

| | | | |
|---|---|---|---|
| 9,493,080 B2 | 11/2016 | Kvieska et al. | |
| 10,654,373 B2* | 5/2020 | Kim | B60L 53/22 |
| 10,661,671 B2* | 5/2020 | Kim | H02M 1/36 |
| 2005/0017699 A1* | 1/2005 | Stanley | H02M 1/4208 323/282 |
| 2010/0080022 A1 | 4/2010 | Schmidt | |
| 2010/0097829 A1* | 4/2010 | Uno | H02M 1/44 363/124 |
| 2010/0110739 A1* | 5/2010 | Nishikawa | H02M 1/4225 363/124 |
| 2012/0014152 A1* | 1/2012 | Nakamura | H02M 1/4258 363/126 |
| 2017/0349052 A1* | 12/2017 | Ha | B60L 58/20 |
| 2019/0299792 A1* | 10/2019 | Kim | B60L 53/14 |
| 2020/0009966 A1* | 1/2020 | Kim | H02J 7/0027 |

OTHER PUBLICATIONS

Segaran, "Dynamic Modeling and Control of Dual Active Bridge Bi-Directional DC-DC Converts for Smart Grid Applications", School of Electrical and Computer Engineering, RMIT University, Feb. 7, 2013, 301 pages. (Year: 2013).*

Xiao, "Transient Response Improvement for Multi-[hase Voltage Regulators", Starts, University of Central Floriday, 2008, 208 pages. (Year: 2008).*

* cited by examiner

FIG. 4A     FIG. 4B     FIG. 4C
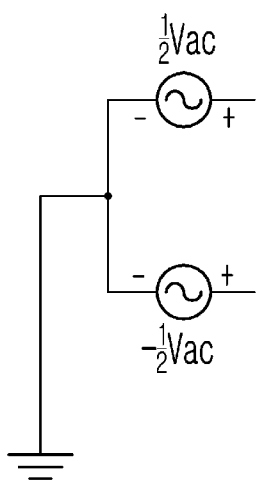
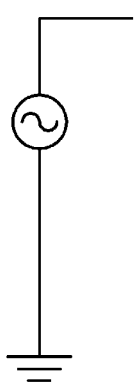
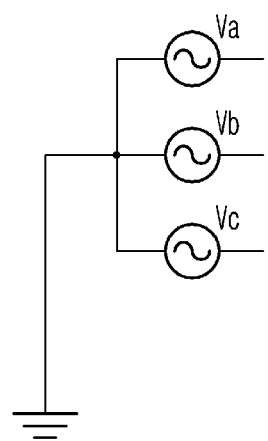
BI-PHASE SYMMETRIC POWER SOURCE
SINGLE-PHASE ASYMMETRIC POWER SOURCE
THREE-PHASE SYMMETRIC POWER SOURCE

CHARGING APPARATUS FOR ELECTRIC VEHICLE

CROSS-REFERENCE TO RELATED APPLICATION

This application is based on and claims priority under 35 U.S.C. § 119 to Korean Patent Application No. 10-2018-0039010, filed on Apr. 4, 2018, the disclosure of which is incorporated by reference in its entirety.

BACKGROUND

1. Field of the Disclosure

The present disclosure relates to a vehicle, and more particularly, to a charging apparatus for an electric vehicle configured to travel only using power of a motor.

2. Description of the Related Art

Unlike an internal combustion vehicle designed to acquire primary energy by burning fossil fuels, an electric vehicle is designed to use electric energy as a primary energy source. Therefore, the electric vehicle includes a high-voltage battery that stores electric energy therein, a motor used as a power source, and an inverter to drive the motor.

A charger for charging the battery of the electric vehicle may be classified into a slow-speed charger and a high-speed charger. The slow-speed charger may transmit commercial alternating current (AC) power to a vehicle without change. The high-speed charger may convert commercial AC power into direct current (DC) power, and may transmit the DC power to the vehicle. The slow-speed charger has a simplified structure and a low price, and thus, the slow-speed charger is capable of being developed more easily. However, to use the slow-speed charger, an on board charger (OBC) is required to be mounted within the electric vehicle.

The type of AC powers provided through the slow-speed charger varies according to the country where the slow-speed chargers are installed. To charge a battery of the electric vehicle using various types of AC power, it is necessary for the on board charger (OBC) to be responsive to various types of AC powers. Since a battery of the electric vehicle has higher capacity, a traveling distance of the electric vehicle provided with the battery charged once is also increasing. Therefore, many developers and vehicle manufacturers are conducting research into technology for increasing battery capacity of the electric vehicle. A large-capacity battery embedded in the electric vehicle unavoidably incurs the increasing of a total charging time of the electric vehicle. To reduce the charging time of the large-capacity battery, there is a need to increase the OBC capacity. The increasing OBC capacity may unavoidably increase the size of constituent elements of the electric vehicle and production costs of the electric vehicle.

SUMMARY

Therefore, the present disclosure provides a charging apparatus for an electric vehicle, which has a reduced-sized and simplified structure, and charges a battery of the electric vehicle upon receiving power from various kinds of power sources. Additional aspects of the present disclosure will be set forth in part in the description which follows and, in part, will be obvious from the description, or may be learned by practice of the present disclosure.

In accordance with an aspect of the present disclosure, a charging apparatus for an electric vehicle may include: an alternating current (AC) power input terminal configured to receive at least one AC input power between single-phase AC power and multi-phase AC power; a power factor corrector having a plurality of full bridge circuits configured to receive the AC input power via the AC power input terminal; a link capacitor configured to be charged through the power factor corrector; a switch network a first switch S1 for connecting any one of an AC power input line and a neutral line of the AC power input terminal to the power factor corrector, and at least one second switch for selectively connecting the AC power input terminal to the power factor corrector, or the link capacitor; and a controller configured to operate the power factor corrector and the switch network based on a condition of AC input power received through the AC power input terminal. The at least one second switch may further include a third switch and a fourth switch disposed to connect each of the plurality of full bridge circuits constituting the power factor corrector to a positive electrode of a battery.

The plurality of full bridge circuits may further include a first full bridge circuit and a second full bridge circuit. A first leg of the first full bridge circuit may be connected to a first AC power input line of the AC power input terminal; and a second leg of the first full bridge circuit may be selectively connected to any one of a second AC power input line and a neutral line of the AC power input terminal through the first switch S1.

A first leg of the second full bridge circuit may be connected to a third AC power input line of the AC power input terminal via a fifth switch; and a second leg of the second full bridge circuit may be connected to the positive electrode of the battery via the fourth switch. The switch network may further include a sixth switch disposed to connect the first leg of the first full bridge circuit and the first leg of the second full bridge circuit; and a seventh switch disposed to connect the second leg of the first full bridge circuit and the second leg of the second full bridge circuit.

The switch network may further include an eighth switch disposed to connect a node where the seventh switch and the second leg of the second full bridge circuit are connected to an upper end of the first full bridge circuit; and a ninth switch disposed to connect the upper end of the first full bridge circuit and an upper end of the second full bridge circuit. The switch network may further include a tenth switch and an eleventh switch disposed to connect both ends of the link capacitor to the positive electrode and a negative electrode of the battery. The switch network may further include a twelfth switch disposed to connect the upper end of the first full bridge circuit and an end of the link capacitor.

In accordance with another aspect of the present disclosure, a charging apparatus for an electric vehicle may include: an alternating current (AC) power input terminal configured to receive at least one AC input power between single-phase AC power and multi-phase AC power; a power factor corrector having a first full bridge circuit and a second full bridge circuit configured to receive the AC input power via the AC power input terminal; a link capacitor configured to be charged through the power factor corrector; a switch network having a first switch for connecting any one of an AC power input line and a neutral line of the AC power input terminal to the power factor corrector, and at least one second switch for selectively connecting the AC power input terminal to the power factor corrector, or the link capacitor; and a controller configured to operate the power factor corrector and the switch network based on a condition of AC input power received through the AC power input terminal.

The at least one second switch may further include a third switch and a fourth switch disposed to connect each of the plurality of full bridge circuits of the power factor corrector to a positive electrode of a battery. A first leg of the first full bridge circuit may be connected to a first AC power input line of the AC power input terminal; a second leg of the first full bridge circuit may be selectively connected to any one of a second AC power input line and a neutral line of the AC power input terminal via a first switch; a first leg of the second full bridge circuit may be connected to a third AC power input line of the AC power input terminal via a fifth switch; and a second leg of the second full bridge circuit may be connected to the positive electrode of the battery through the fourth switch.

The switch network may further include a sixth switch disposed to connect the first leg of the first full bridge circuit and the first leg of the second full bridge circuit; and a seventh switch disposed to connect the second leg of the first full bridge circuit and the second leg of the second full bridge circuit. The switch network may further include an eighth switch disposed to connect a node where the seventh switch and the second leg of the second full bridge circuit are connected to an upper end of the first full bridge circuit; and a ninth switch disposed to connect the upper end of the first full bridge circuit and an upper end of the second full bridge circuit.

The switch network may further include a tenth switch and an eleventh switch disposed to connect both ends of the link capacitor to the positive electrode and a negative electrode of the battery. The switch network may further include a twelfth switch disposed to connect the upper end of the first full bridge circuit and an end of the link capacitor.

In accordance with another aspect of the present disclosure, a charging apparatus for an electric vehicle may include: an alternating current (AC) power input terminal configured to receive at least one AC input power between single-phase AC power and multi-phase AC power; a power factor corrector having a first full bridge circuit and a second full bridge circuit configured to receive the AC input power via the AC power input terminal; a link capacitor to be charged through the power factor corrector; a switch network having a first switch S1 for connecting any one of an AC power input line and a neutral line of the AC power input terminal to the power factor corrector, and at least one second switch for selectively connecting the AC power input terminal to the power factor corrector, or the link capacitor; and a controller configured to operate the power factor corrector and the switch network according to a condition of AC input power received through the AC power input terminal.

The at least one second switch may further include a third switch and a fourth switch disposed to connect each of the plurality of full bridge circuits of the power factor corrector to a positive electrode of a battery. A first leg of the first full bridge circuit may be connected to a first AC power input line of the AC power input terminal; a second leg of the first full bridge circuit may be selectively connected to any one of a second AC power input line and a neutral line of the AC power input terminal through a first switch; a first leg of the second full bridge circuit may be connected to a third AC power input line of the AC power input terminal through a fifth switch; and a second leg of the second full bridge circuit may be connected to the positive electrode of the battery through the fourth switch.

The switch network may further include a sixth switch disposed to connect the first leg of the first full bridge circuit and the first leg of the second full bridge circuit; a seventh switch disposed to connect the second leg of the first full bridge circuit and the second leg of the second full bridge circuit; an eighth switch disposed to connect a node where the seventh switch and the second leg of the second full bridge circuit may be connected to an upper end of the first full bridge circuit; a ninth switch disposed to connect the upper end of the first full bridge circuit and an upper end of the second full bridge circuit; a tenth switch and an eleventh switch disposed to connect both ends of the link capacitor to the positive electrode and a negative electrode of the battery; and a twelfth switch disposed to connect the upper end of the first full bridge circuit and an end of the link capacitor.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIGS. 4A-4C are views illustrating various types of power sources embedded in the OBC according to an exemplary embodiment of the present disclosure;

DETAILED DESCRIPTION

Figure 1:
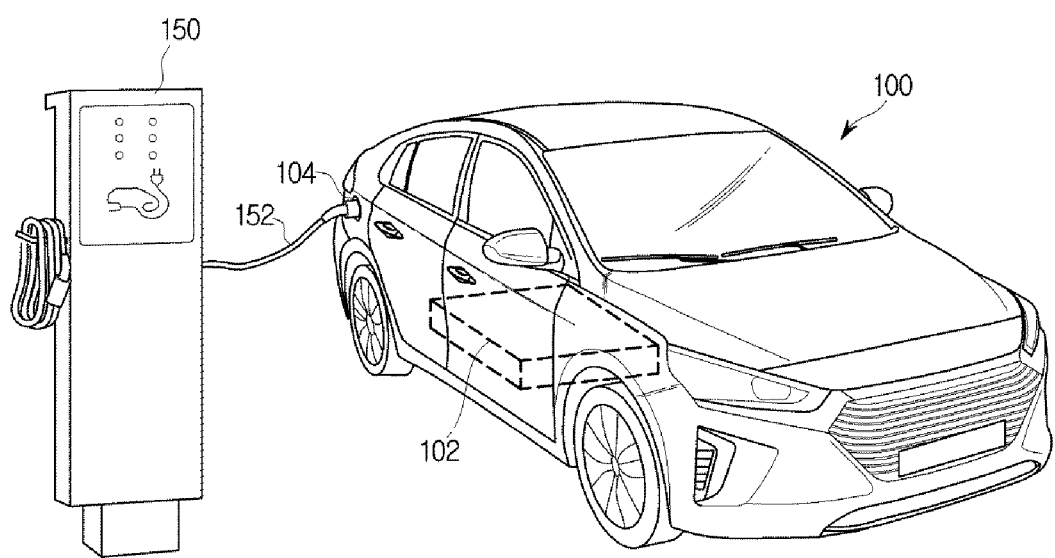
FIG. 1 is a view illustrating the appearance of an electric vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings, wherein like reference numerals refer to like elements throughout.

FIG. 1 is a view illustrating the appearance of an electric vehicle according to an exemplary embodiment. Referring to FIG. 1, the electric vehicle 100 may include a motor 212 (see FIG. 2). Therefore, the electric vehicle 100 may further include a high-voltage battery 102 configured to store power to be used for driving the motor 212. An auxiliary battery 208 (see FIG. 2) may also be provided on one side of the engine room in a general internal combustion vehicle. However, a large high-capacity high-voltage battery 212 is required for the electric vehicle 100 whereas an auxiliary battery 208 (see FIG. 2) is provided at one side of an engine compartment of a general internal combustion vehicle. In the electric vehicle 100 according to the exemplary embodiment, the high-voltage battery 102 may be installed at a lower space of a rear passenger seat. Power stored in the high-voltage battery 102 may be used to generate power by driving the motor 212 (see FIG. 2). The high-voltage battery 102 according to the exemplary embodiment may be a lithium battery.

The electric vehicle 100 may include a charging socket 104. A charging connector 152 of an external slow-speed charger 150 may be connected to the charging socket 104 to charge the high-voltage battery 102 with electricity or power. In other words, when the charging connector 152 of the slow-speed charger 150 is connected to the charging socket 104 of the electric vehicle 100, the high-voltage battery 102 of the electric vehicle 100 may be charged with electricity or power.

Figure 2:
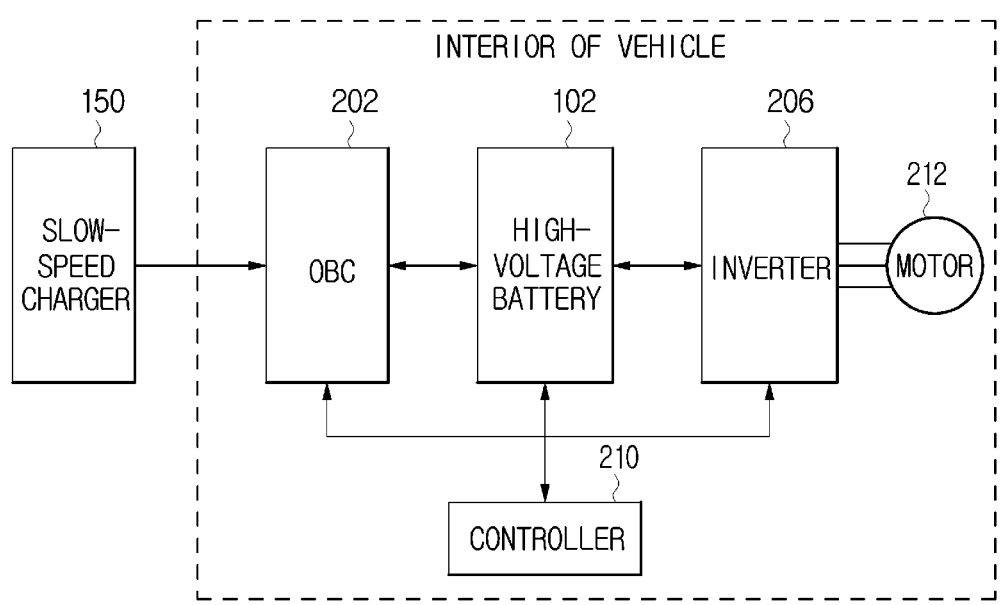
FIG. 2 is a block diagram illustrating a charging apparatus for an electric vehicle according to an exemplary embodiment of the present disclosure.

FIG. 2 is a block diagram illustrating a charging apparatus for the electric vehicle according to an exemplary embodiment. Referring to FIG. 2, the slow-speed charger 150 may be used to charge the high-voltage battery 102. The high-voltage battery 102 may have a charging voltage of about 400V-800V. The slow-speed charger 150 may be configured to supply AC power to the electric vehicle 100 without change. The AC power supplied through the slow-speed charger 150 may be converted into a predetermined DC voltage in the electric vehicle 100.

An on board charger (OBC) 202 embedded within the electric vehicle 100 may be used to charge the high-voltage battery 102. The OBC 202 may be configured to convert AC power supplied from the slow-speed charger 150 into a DC voltage of about 800V, and may be configured to charge the high-voltage battery 102 with the DC voltage of about 800V. The slow-speed charger 150 may be configured to supply AC power to the electric vehicle 100 without change (e.g., without any conversion). The AC voltage supplied through the slow-speed charger 150 may be converted into a DC voltage by the OBC 202, and may be used to charge the high-voltage battery 102.

Referring again to FIG. 2, an inverter 206 may be configured to convert the power of the high-voltage battery 102 to have the electrical characteristics required by the motor 212, and transfer the power to the motor 212. The motor 212 may be configured to generate power by being rotated by the power transmitted through the inverter 206. In the charging apparatus shown in FIG. 2, only the OBC 202 may be used in charging the high-voltage battery 102, and the motor 212 and the inverter 206 may not be used in charging the high-voltage battery 102.

Figure 3:
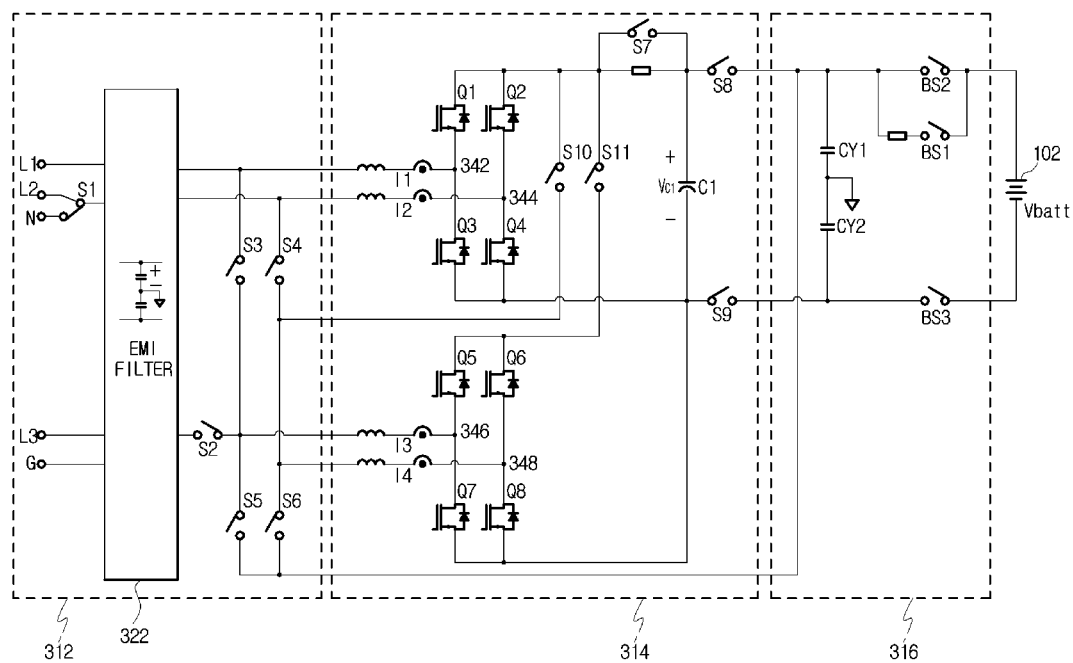
FIG. 3 is a view illustrating a configuration of an on board charger (OBC) according to an exemplary embodiment of the present disclosure.

FIG. 3 is a circuit diagram illustrating an on board charger (OBC) according to an exemplary embodiment of the present disclosure. The high-voltage battery 102 of FIG. 3 may be configured to supply power to the motor 212 through the inverter 206, as shown in FIG. 2. Referring to FIG. 3, the OBC 202 may include an inputter 312, a boost power factor corrector 314, and a power relay assembly 316. The inputter 312 may be configured to receive AC power from an external AC power source. The inputter 312 may include 5 input lines L1, L2, L3, N, and G, an electromagnetic interference (EMI) filter 322, and a switch S1.

The EMI filter 322 may be configured to remove noise included in the received AC power. Additionally, the EMI filter 322 may be connected to the five input lines L1, L2, L3, N, and G. The AC power may be input from the external AC power source to the EMI filter 322 through the input lines L1, L2, L3, N, and G. L1, L2, and L3 may be AC power input lines, N is a neutral line, and G is a ground line. A maximum of three-phase AC power may be input to the EMI filter 322 through the AC power input lines L1, L2 and L3 from among the five input lines L1, L2, L3, N, and G. In other words, three-phase AC power may be input to the EMI filter 322 through all the AC power input lines L1, L2, and L3. Alternatively, bi-phase AC power may be input to the EMI filter 322 only through the AC power input lines L1 and L2, or single-phase AC power may be input to the EMI filter 322 only through the AC power input line L1 and the neutral line N.

The switch S1 of the inputter 312 may connect any one of the AC power input line L2 and the neutral line N to the EMI filter 322. If the input AC power is three-phase AC power or bi-phase AC power, the switch S1 may be operated to connect the AC power input line L2 to the EMI filter 322. If the input AC power is single-phase AC power, the switch S1 may be operated to connect the neutral line N to the EMI filter 322. The boost power factor corrector 314 may include a first full bridge circuit composed of switching elements Q1, Q2, Q3, and Q4, and a second full bridge circuit composed of switching elements Q5, Q6, Q7, and Q8. A first leg 342 disposed between the switching elements Q1 and Q3, a second leg 344 disposed between the switching elements Q2 and Q4, a third leg 346 disposed between the switching elements Q5 and Q7, and a fourth leg 348 disposed between the switching elements Q6 and Q8 may be connected to the EMI filter 322. Each of the first to fourth legs 342, 344, 346, and 348 may include an inductor component.

In the charging apparatus according to the exemplary embodiment shown in FIG. 3, the full bridge circuit constituting the boost power factor corrector 314 may include four switching elements Q1, Q2, Q3, and Q4, and two legs 342 and 344 in one group (e.g., the first full bridge circuit), and the other four switching elements Q5, Q6, Q7, and Q8 and the two legs 346 and 348 in another group (e.g., the second full bridge circuit). The first full bridge circuit and the second full bridge circuit may be connected in parallel between the EMI filter 322 and a capacitor C1 described later.

In the first full bridge circuit, the leg 342 (e.g., a first leg) may be connected to the AC power input line L1, and the other leg 344 (e.g., a second leg) may be connected to the AC power input line L2 and the neutral line N. Which of the AC power input line L2 and the neutral line N is connected to the leg 344 may be determined according to on/off of the switch S1 at the inputter 312. The AC power input line L2 may be connected to the leg 344 when the switch S1 is turned off and the neutral line N may be connected to the leg 344 when the switch S1 is turned on.

In the second full bridge circuit, the leg 346 (e.g., a third leg) may be connected to the AC power input line L1 via the switch S3, and the other leg 348 (e.g., a fourth leg) may be connected to the AC power input line L2 and the neutral line N via the switch S4 and to the AC power input line L3 via the switch S2. Thus, when the switch S2 is turned off and the switch S3 is turned on, the leg 346 may be connected to the AC power input line L1. Which of the AC power input line L2 and the neutral line N is connected to the leg 348 may be determined according to on/off of the switch S1 at the inputter 312. The AC power input line L2 may be connected to the leg 348 when the switch S1 is turned off and the neutral line N may be connected to the leg 348 when the switch S1 is turned on. Conversely, when the switch S2 is turned on, the leg 348 may be connected to the AC power input line L3, and when the switch S4 is turned on in this state, the leg 344 of the first full bridge circuit may also be connected to the AC power input line L3.

A first end of the other switch S5 may be connected to a node where the leg 346 of the second full bridge circuit and the switch S3 are connected, and a second end of the switch S5 may be connected to a positive (+) electrode of the high-voltage battery 102 via switches BS1 and BS2 to be described later. When the switches S3 and S5 are both turned on, the AC power input line L1 and the leg 342 may be connected to the positive (+) electrode of the high voltage-battery 102 via the switches BS1 and BS2. Alternatively, when the switch S3 is turned off and the switch S5 is turned on, only the leg 346 of the second full bridge circuit may be connected to the positive (+) electrode of the high-voltage battery 102.

A first end of the other switch S6 may be connected to a node where the leg 348 of the second full bridge circuit and the switch S4 are connected, and a second end of the switch S6 may be connected to the positive (+) electrode of the high-voltage battery 102 via the switches BS1 and BS2. When the switches S4 and S6 are both turned on, the AC power input line L2 and the legs 344 may be connected to the positive (+) electrode of the high-voltage battery 102 via the switches BS1 and BS2. Alternatively, when the switch S4 is turned off and the switch S6 is turned on, only the leg 348 of the second full bridge circuit may be connected to the positive (+) electrode of the high-voltage battery 102 (e.g., when the switch S2 is turned off). The AC power input line L3 may be connected to the positive (+) electrode of the high-voltage battery 102 when the switch S4 is turned off and the switch S6 is turned on in a state in which the switch S2 is turned on.

The node where the leg 348 of the second full bridge circuit and the switch S4 are connected may be connected between a switch S7 and the upper ends (Q1 and Q2 sides) of the first full bridge circuit via a switch S10. Further, the upper ends (Q5 and Q6 sides) of the second full bridge circuit may be connected between the upper ends (Q1 and Q2 sides) of the first full bridge circuit and the switch S7 via a switch S11. The boost power factor corrector 314 may include the capacitor C1 which is a PFC link capacitor described above. The capacitor C1 may be disposed between both ends of the first full bridge circuit and the second full bridge circuit.

Switches S7 and S8 may be further included in the boost power factor corrector 314. In particular, the switch S7 may be disposed between an upper end of each of the first full bridge circuit and the second full bridge circuit and the positive (+) electrode of the capacitor C1, and may also be connected in parallel to a power factor correction element P1. The switch S8 may be disposed at both ends of the capacitor C1, and may electrically interconnect the boost power factor corrector 314 and the power relay assembly 316 to be described. In other words, the boost power factor corrector 314 may be electrically connected to the power relay assembly 316 via the switch S8. The boost power factor corrector 314 may also be electrically connected to both ends of the high-voltage battery 102 via the switch S8.

A switch S9 may be connected between the lower end of each of the first full bridge circuit and the second full bridge circuit and a negative (−) electrode of the high-voltage battery 102. Capacitors CY1 and CY2, each of which operates as an equivalent modeling capacitor Y, may be connected in series to the power relay assembly 316. A node through which the capacitors CY1 and CY2 are interconnected may be grounded.

Two switches BS1 and BS2 and a single power factor element P2 may be disposed between the capacitor CY1 and the positive (+) electrode of the high-voltage battery 102. The switch BS1 and the power factor element P1 may be connected in series between the capacitor CY1 and the positive (+) electrode of the high-voltage battery 102, and the switch BS2 may be connected in parallel to this serial connection structure.

The switch BS3 may be disposed between the capacitor CY2 and the negative (−) electrode of the high-voltage battery 102. The plurality of switches S1, S2, S3, S4, S5, S6, S7, S8, S9, S10, S11, BS1, BS2, and BS3 included in the switch network provided in the OBC 202 may be turned on or off by the controller 210 shown in FIG. 2. According to the exemplary embodiment, the high-voltage battery 102 may be charged with various types of AC powers through various on/off combinations of the plurality of switches S1, S2, S3, S4, S5, S6, S7, S8, S9, S10, S11, BS1, BS2, and BS3 included in the switch network. Various types of AC powers may hereinafter be described with reference to FIGS. 4A-4C. Turn-on operation and turn-off operation of the switches S1, S2, S3, S4, S5, S6, S7, S8, S9, S10, S11, BS1, BS2, and BS3 shown in FIG. 3 may be executed by the controller 210, and turn-on operation and turn-off operation of the switching elements Q1, Q2, Q3, Q4, Q5, Q6, Q7, and Q8 shown in FIG. 3 may also be executed by the controller 210.

FIGS. 4A-4C are views illustrating various types of power sources embedded in the OBC according to an exemplary embodiment. FIG. 4A is a view illustrating a bi-phase symmetric power source. Referring to FIG. 4A, the bi-phase symmetric power source may allow a power-supply voltage to be divided into two voltages ½ Vac and −½ Vac. Since two voltages ½Vac and −½Vac may have opposite phases, the two voltages may be referred to as a bi-phase symmetric power source. The bi-phase symmetric power source shown in FIG. 4A is mainly used in North America.

FIG. 4B is a view illustrating a single-phase asymmetric power source. Referring to FIG. 4B, the single-phase asymmetric power source may provide a power-supply voltage formed in a single voltage (Vac) having a single phase. Since the single voltage (Vac) has a single phase, the single voltage (Vac) may be referred to as a single-phase asymmetric power source. The single-phase asymmetric power-supply shown in FIG. 4B is mainly used in Korea, North America, and Europe.

FIG. 4C is a view illustrating a three-phase symmetric power source. Referring to FIG. 4C, the three-phase asymmetric power source may allow a power-supply voltage to be divided into three voltages Va, Vb, and Vc. Since three voltages Va, Vb, and Vc may have different phases, the three voltages may be referred to as a three-phase asymmetric power source. The three-phase asymmetric power source shown in FIG. 4C is mainly used in Europe.

Various types of AC power sources are used in different countries as described above, and thus, the OBC 202 according to the exemplary embodiment aims to be responsive to various types of AC powers of the individual counties through the on/off combinations of the switch network. For example, for the bi-phase symmetric power source, a boost power factor corrector formed in a single-phase full bridge inverter type is implemented, and thus, the high-voltage battery 102 may be charged with power. For the single-phase asymmetric power source, a boost power factor corrector formed in a single-phase full bridge inverter type is implemented along with a buck converter, and thus, the high-voltage battery 102 may also be charged with power. For the three-phase symmetric power source, the three-leg boost power factor corrector is implemented along with a motor/inverter, buck converter, and thus, the high-voltage battery 102 may be charged.

Figure 5:
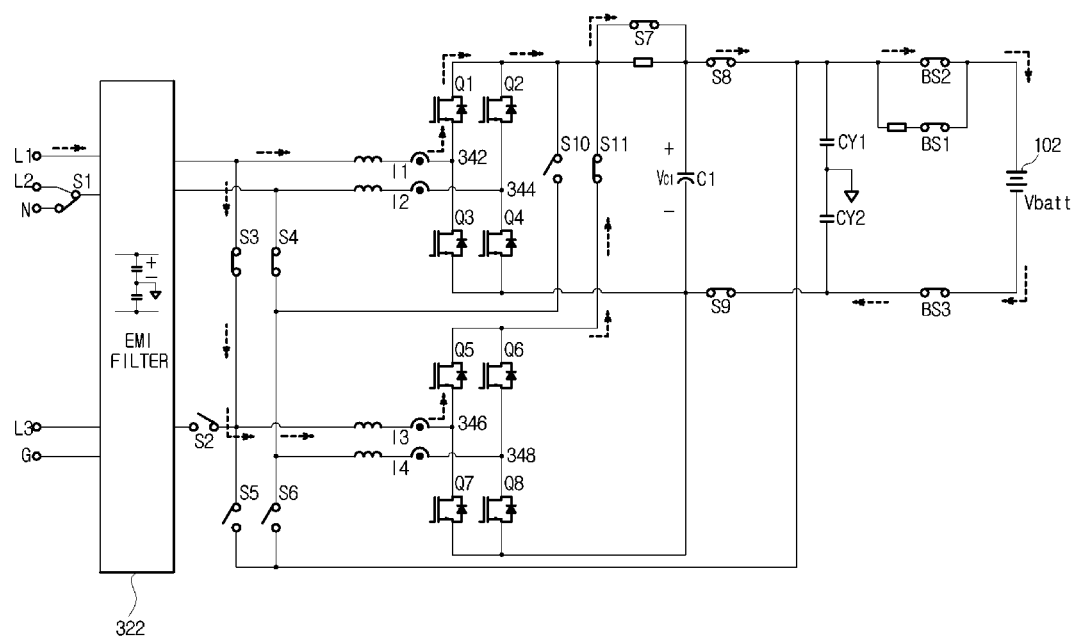
FIG. 5 is a view illustrating on/off combinations of a switch network coping with bi-phase symmetrical power source for use in North America according to an exemplary embodiment of the present disclosure.
Figure 6:
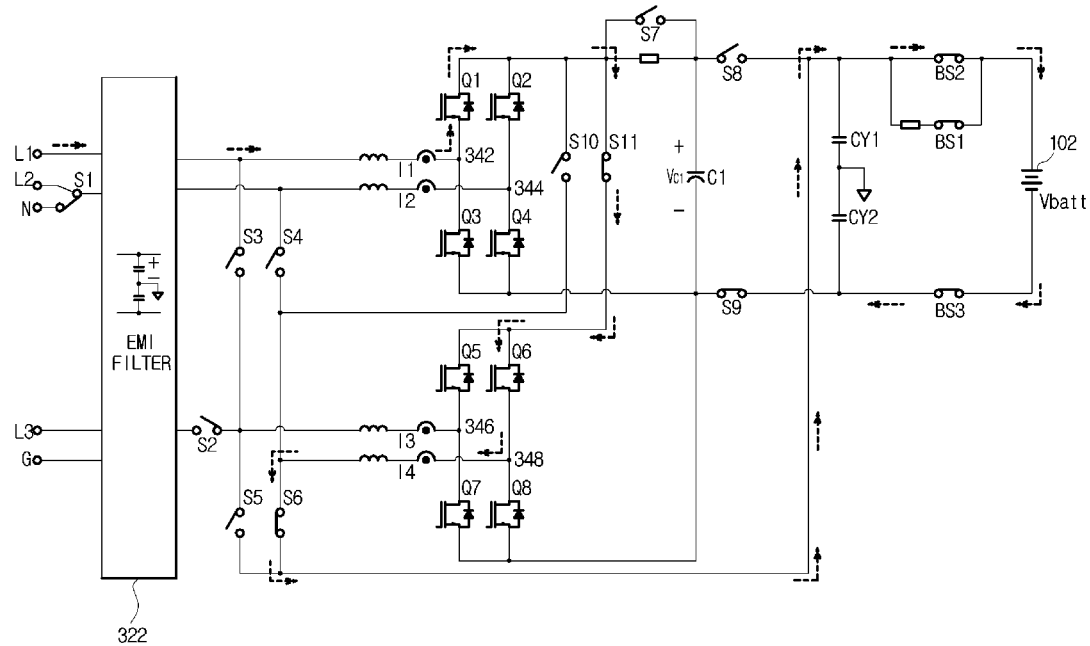
FIG. 6 is a view illustrating on/off combinations of a switch network coping with bi-phase symmetrical power source for use in North America according to an exemplary embodiment of the present disclosure.

FIGS. 5 to 13 are views illustrating on/off combinations of a switch network coping with various types of AC power sources for use in different countries. FIGS. 5 and 6 are views illustrating on/off combinations of a switch network coping with bi-phase symmetrical power source for use in North America. In particular, FIG. 5 is a view illustrating a method for operating the switch network when a peak value of a voltage (Vc1) of the capacitor C1 is less than a required voltage for charging (Vbatt) of the high-voltage battery 102. FIG. 6 is a view illustrating a method for operating the switch network when a peak value of the voltage (Vc1) of the capacitor C1 is equal to the required voltage for charging (Vbatt) of the high-voltage battery 102.

Figure 7:
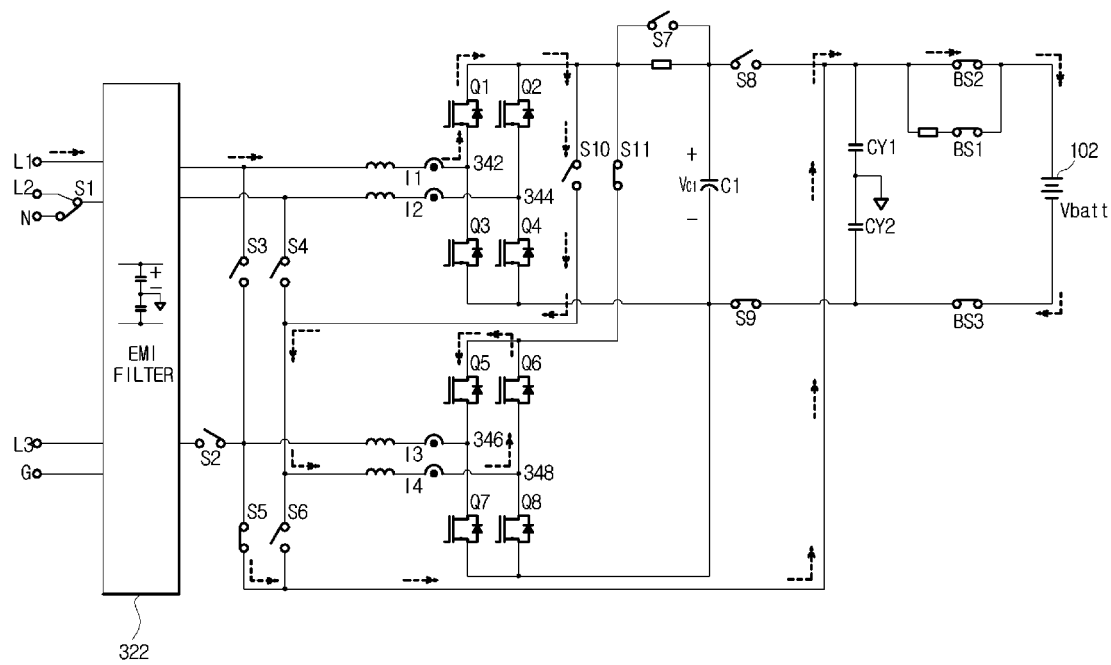
FIG. 7 is a view illustrating on/off combinations of a switch network coping with single-phase asymmetrical power source for use in North America according to an exemplary embodiment of the present disclosure.
Figure 8:
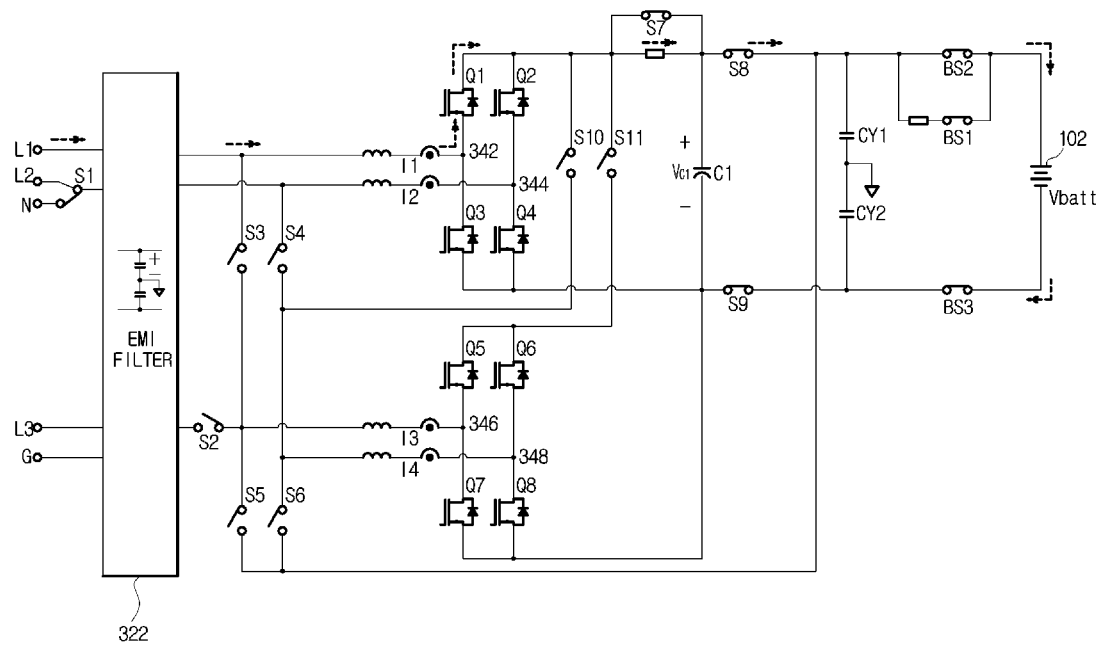
FIG. 8 is a view illustrating on/off combinations of a switch network coping with single-phase asymmetrical power source for use in North America according to an exemplary embodiment of the present disclosure.

FIGS. 7 and 8 are views illustrating on/off combinations of the switch network coping with single-phase asymmetrical power source for use in North America. In particular, FIG. 7 is a view illustrating a method for operating the switch network when a peak value of the voltage (Vc1) of the capacitor C1 is substantially less than the required voltage for charging (Vbatt) of the high-voltage battery 102. FIG. 8 is a view illustrating a method for operating the switch network when a peak value of the voltage (Vc1) of the capacitor C1 is the same as the required voltage for charging (Vbatt) of the high-voltage battery 102.

Figure 9:
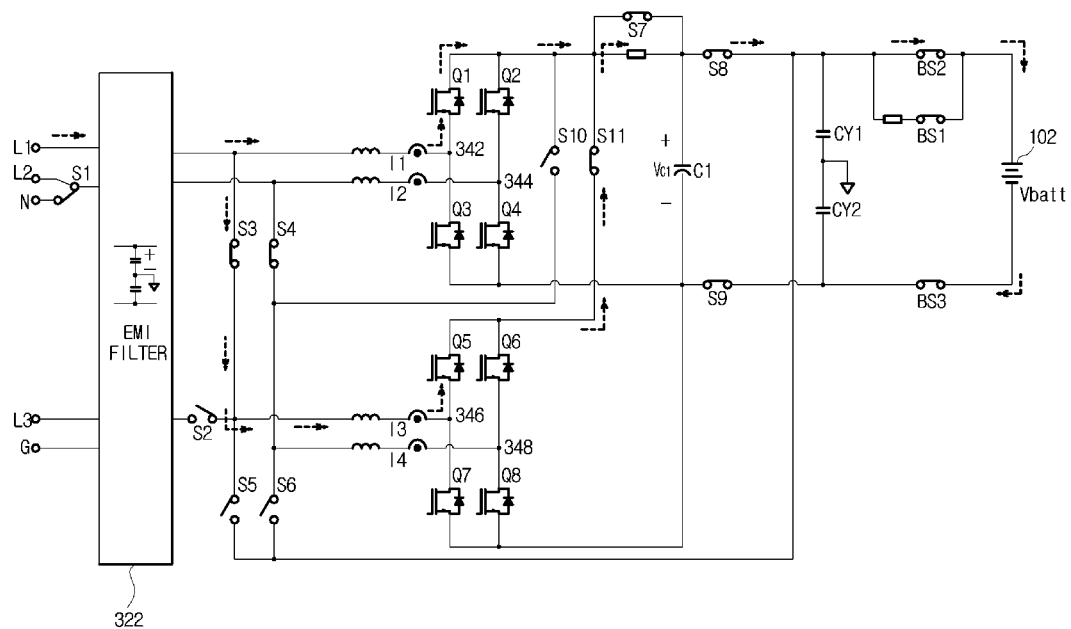
FIG. 9 is a view illustrating on/off combinations of a switch network coping with single-phase asymmetrical power source for use in Korea and Europe according to an exemplary embodiment of the present disclosure.
Figure 10:
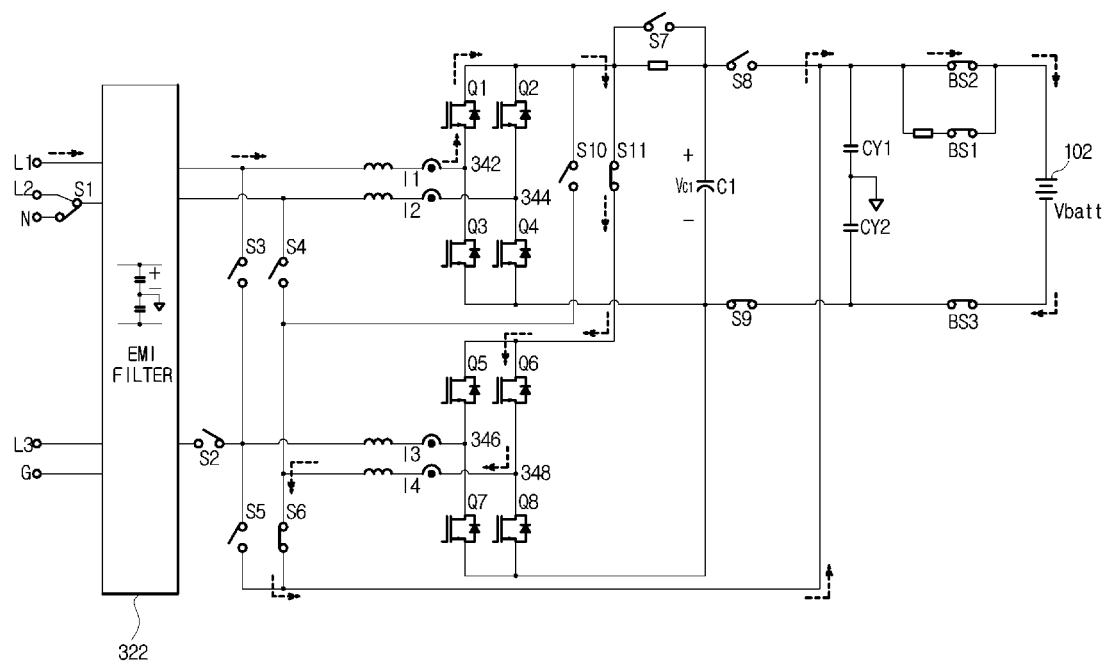
FIG. 10 is a view illustrating on/off combinations of a switch network coping with single-phase asymmetrical power source for use in Korea and Europe according to an exemplary embodiment of the present disclosure.

FIGS. 9 and 10 are views illustrating on/off combinations of the switch network coping with single-phase asymmetrical power source for use in Korea and Europe. In particular, FIG. 9 is a view illustrating a method for operating the switch network when a peak value of the voltage (Vc1) of the capacitor C1 is less than the required voltage for charging (Vbatt) of the high-voltage battery 102. FIG. 10 is a view illustrating a method for operating the switch network when a peak value of the voltage (Vc1) of the capacitor C1 is greater than the required voltage for charging (Vbatt) of the high-voltage battery 102.

Figure 11:
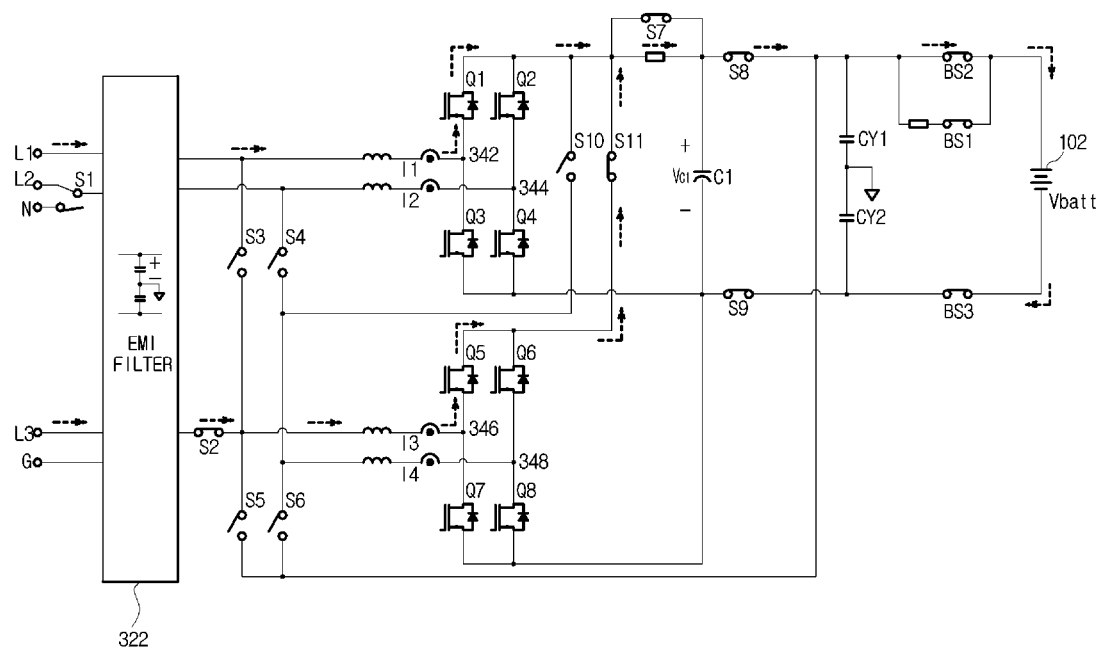
FIG. 11 is a view illustrating on/off combinations of a switch network coping with three-phase symmetrical power source for use in Europe according to an exemplary embodiment of the present disclosure.
Figure 12:
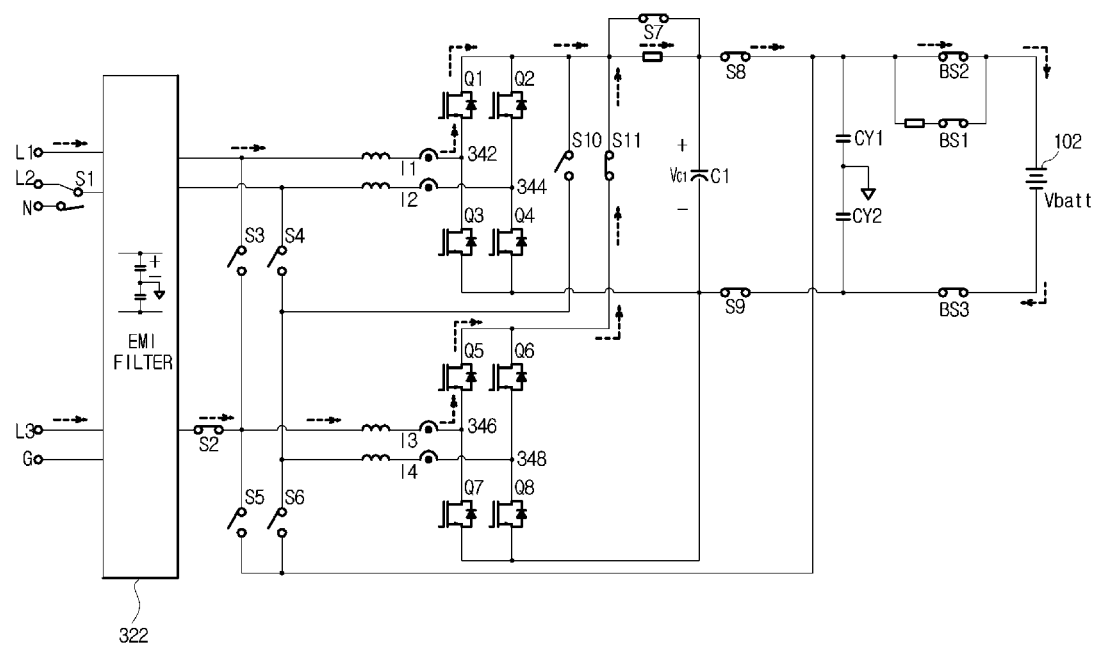
FIG. 12 is a view illustrating on/off combinations of a switch network coping with three-phase symmetrical power source for use in Europe according to an exemplary embodiment of the present disclosure.
Figure 13:
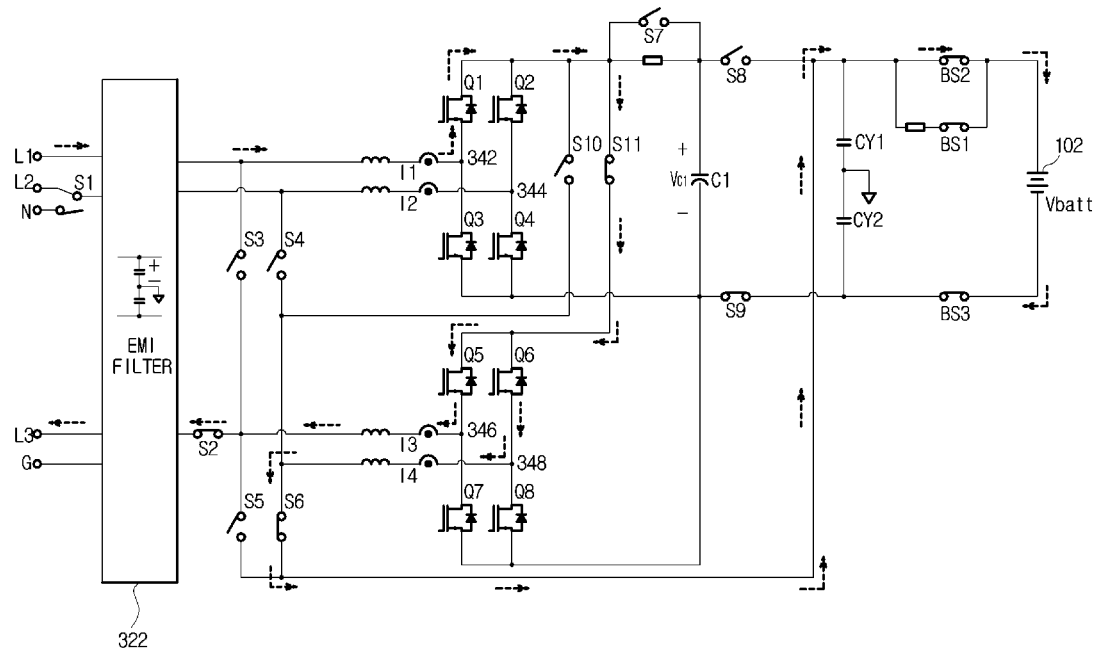
FIG. 13 is a view illustrating on/off combinations of a switch network coping with three-phase symmetrical power source for use in Europe according to an exemplary embodiment of the present disclosure.

FIGS. 11 to 13 are views illustrating on/off combinations of the switch network coping with three-phase symmetrical power source for use in Europe. In particular, FIG. 11 is a view illustrating a method for operating the switch network when a peak value of the voltage (Vc1) of the capacitor C1 is less than the required voltage for charging (Vbatt) of the high-voltage battery 102. FIGS. 12 and 13 are views illustrating a method for operating the switch network when a peak value of the voltage (Vc1) of the capacitor C1 is greater than the required voltage for charging (Vbatt) of the high-voltage battery 102.

FIG. 5 is a view illustrating on/off combinations of the switch network coping with bi-phase symmetrical power source for use in North America. In particular, FIG. 5 is a view illustrating a method for operating the switch network when the peak voltage of the voltage (Vc1) of the capacitor C1 is less than the required voltage for charging (Vbatt) of the high-voltage battery 102. In FIG. 5, the on/off combinations of the respective switches S1, S2, S3, S4, S5, S6, S7, S8, S9, S10, S11, BS1, BS2, and BS3 for use in the switch network are as follows.

S1:ON, S2:OFF, S3:ON, S4:ON, S5:OFF, S6:OFF, S7:ON, S8:ON, S9:ON, S10:OFF, S11:ON

BS1:ON, BS2:ON, BS3:ON

The switch S1 may be turned on to connect the neutral line N to the EMI filter 322, to allow bi-phase symmetric AC power to be input to the electric vehicle through the AC power input line L1 and the neutral line N. The switches S2 and S5 may be turned off, and the switches S3, S4, S7, and S8 may be turned on. As a result, the leg 346 of the second full bridge circuit may be connected to the AC power input line L1 via the switches S3 and S4, and the leg 348 of the second full bridge circuit may be connected to the neutral line N. The switch S11 may also be turned on. The second full bridge circuit and the switch S7 may be connected by turning on the switch S11. In addition, the switching elements Q1 and Q5 of the boost power factor corrector 314 may be turned on.

By the above-mentioned on/off combinations of the switch network, the high-voltage battery 102 may be directly charged through both the first full bridge circuit and the second full bridge circuit along a path denoted by a dotted arrow of FIG. 5. The operation for charging the high-voltage battery 102 by the bi-phase symmetric AC power received through the EMI filter 322 may be performed since the peak voltage of the voltage (Vc1) of the capacitor C1 is less than the required voltage for charging (Vbatt) of the high-voltage battery 102. Since an interleaved-inverter-type boost power factor corrector is implemented by the above-mentioned on/off combinations of the switch network, the implementation result may be responsive to the bi-phase symmetric power source used in North America.

FIG. 6 is a view illustrating on/off combinations of the switch network coping with bi-phase symmetrical power source for use in North America. In particular, FIG. 6 is a view illustrating a method for operating the switch network when the peak voltage of the voltage (Vc1) of the capacitor C1 is greater than the required voltage for charging (Vbatt) of the high-voltage battery 102. In FIG. 6, the on/off combinations of the respective switches S1, S2, S3, S4, S5, S6, S7, S8, S9, S10, S11, BS1, BS2, and BS3 for use in the switch network are as follows.

S1:ON, S2:OFF, S3:OFF, S4:OFF, S5:OFF, S6:ON, S7:OFF, S8:OFF, S9:ON, S10:OFF, S11:ON

BS1:ON, BS2:ON, BS3:ON

The switch S1 may be turned on to connect the neutral line N to the EMI filter 322, to allow bi-phase symmetric AC power to be input to the electric vehicle through the AC power input line L1 and the neutral line N. All of the switches S2, S3, and S4 may be turned off to disconnect the AC power input lines L1, L2, and L3 from the legs 346 and 348 of the second full bridge circuit. The AC power input line L3 and the leg 346 of the second full bridge circuit may be disconnected from the positive (+) electrode of the high-voltage battery 102 since the switch S5 is also turned off. However, since the switches S6 and S11 are turned on, the leg 348 of the second full bridge circuit may be connected to the positive (+) electrode of the high-voltage battery 102. The switches S7 and S8 may be turned off and the switch S9 may be turned on. The switch S11 may also be turned on. The second full bridge circuit and the switch S7 may be connected by turning on the switch S11. In addition, the switching elements Q1 and Q6 of the boost power factor corrector 314 may be turned on.

By the above-mentioned on/off combinations of the switch network, the high-voltage battery 102 may be directly charged through the first full bridge circuit and the second full bridge circuit along a path denoted by a dotted arrow of FIG. 6. A charge voltage of the capacitor C1 may charge the high-voltage battery 102 through the first full bridge circuit and the second full bridge circuit along a path denoted by a solid arrow of FIG. 6. The operation for charging the high-voltage battery 102 may be performed since a peak voltage of the voltage (Vc1) of the capacitor C1 is greater than the required voltage for charging (Vbatt) of the high-voltage battery 102. Since a single-phase full-bridge-inverter-type boost power factor corrector and a buck converter mode are implemented by the above-mentioned on/off combinations of the switch network, the implementation result may be responsive to the bi-phase symmetric power source used in North America.

FIG. 7 is a view illustrating on/off combinations of the switch network coping with single-phase asymmetrical power source for use in North America. In particular, FIG. 7 is a view illustrating a method for operating the switch network when the peak voltage of the voltage (Vc1) of the capacitor C1 is less than the required voltage for charging (Vbatt) of the high-voltage battery 102. In FIG. 7, the on/off combinations of the respective switches S1, S2, S3, S4, S5, S6, S7, S8, S9, S10, S11, BS1, BS2, and BS3 for use in the switch network are as follows.

S1:ON, S2:OFF, S3:OFF, S4:OFF, S5:ON, S6:OFF, S7:OFF, S8:OFF, S9:ON, S10:ON, S11:OFF

BS1:ON, BS2:ON, BS3:ON

The switch S1 may be turned on to connect the neutral line N to the EMI filter 322, to allow bi-phase symmetric AC power to be input to the electric vehicle through the AC power input line L1 and the neutral line N. The switches S2, S3, S4, and S6 may be turned off and the switch S5 may be turned on. As a result, the leg 346 of the second full bridge circuit may be connected to the high-voltage battery 102 via the switch S5. The switch S10 may also be turned on. The node where the leg 348 of the second full bridge circuit and the switch S4 are connected may be connected to the switch S7 by turning on the switch S10. In addition, the switching elements Q1, Q5, and Q6 of the boost power factor corrector 314 may be turned on.

By the above-mentioned on/off combinations of the switch network, the high-voltage battery 102 may be directly charged through the first full bridge circuit and the second full bridge circuit along a path denoted by a dotted arrow of FIG. 7. The operation for charging the high-voltage battery 102 by the bi-phase symmetric AC power received through the EMI filter 322 may be performed since the peak voltage of the voltage (Vc1) of the capacitor C1 is less than the required voltage for charging (Vbatt) of the high-voltage battery 102. Since a single-phase inverter-type boost power factor corrector and a boost converter are implemented by the above-mentioned on/off combinations of the switch network, the implementation result may be responsive to the single-phase asymmetrical power source used in North America.

FIG. 8 is a view illustrating on/off combinations of the switch network coping with single-phase asymmetrical power source for use in North America. In particular, FIG. 8 is a view illustrating a method for controlling the switch network when the peak voltage of the voltage (Vc1) of the capacitor C1 is equal to the required voltage for charging (Vbatt) of the high-voltage battery 102. In FIG. 8, the on/off combinations of the respective switches S1, S2, S3, S4, S5, S6, S7, S8, S9, S10, S11, BS1, BS2, and BS3 for use in the switch network are as follows.

S1:ON, S2:OFF, S3:OFF, S4:OFF, S5:OFF, S6:OFF, S7:ON, S8:ON, S9:ON, S10:OFF, S11:OFF

BS1:ON, BS2:ON, BS3:ON

The switch S1 may be turned on to connect the neutral line N to the EMI filter 322, to allow bi-phase symmetric AC power to be input to the electric vehicle through the AC power input line L1 and the neutral line N. All of the switches S2, S3, S4, S5, S6, and S11 may be turned off to disconnect the AC power input lines L1, L2, and L3 from the legs 346 and 348 of the second full bridge circuit. However, since the switches S1, S7, and S8 are turned on, the switching element Q1 of the first full bridge circuit may be connected to the positive (+) electrode of the high-voltage battery 102 via the switches S7 and S8. In addition, the switching element Q1 of the boost power factor corrector 314 may be turned on.

By the above-mentioned on/off combinations of the switch network, the high-voltage battery 102 may be directly charged through the first full bridge circuit and the second full bridge circuit along a path denoted by a dotted arrow of FIG. 8. The operation for charging the high-voltage battery 102 by the charging voltage of the capacitor C1 may be performed since a peak voltage of the voltage (Vc1) of the capacitor C1 is equal to the required voltage for charging (Vbatt) of the high-voltage battery 102. Since the single-phase full-bridge-inverter-type boost power factor corrector is implemented by the above-mentioned on/off combinations of the switch network, the implementation result may be responsive to the single-phase asymmetric power source used in North America.

FIG. 9 is a view illustrating on/off combinations of the switch network coping with single-phase asymmetrical power source for use in Korea and Europe. In particular, FIG. 9 is a view illustrating a method for operating the switch network when the peak voltage of the voltage (Vc1) of the capacitor C1 is less than the required voltage for charging (Vbatt) of the high-voltage battery 102. In FIG. 9, the on/off combinations of the respective switches S1, S2, S3, S4, S5, S6, S7, S8, S9, S10, S11, BS1, BS2, and BS3 for use in the switch network are as follows.

S1:ON, S2:OFF, S3:ON, S4:ON, S5:OFF, S6:OFF, S7:ON, S8:ON, S9:ON, S10:OFF, S11:ON

BS1:ON, BS2:ON, BS3:ON

The switch S1 may be turned on to connect the neutral line N to the EMI filter 322, to allow bi-phase symmetric AC power to be input to the electric vehicle through the AC power input line L1 and the neutral line N. The switches S2 and S5 may be turned off, and the switches S3, S4, S7, and S8 may be turned on. As a result, the leg 346 of the second full bridge circuit may be connected to the AC power input line L1 via the switches S3 and S4, and the leg 348 of the second full bridge circuit may be connected to the neutral line N. The switch S11 may also be turned on. The second full bridge circuit and the switch S7 may be connected by turning on the switch S11. In addition, the switching elements Q1 and Q5 of the boost power factor corrector 314 may be turned on.

By the above-mentioned on/off combinations of the switch network, the high-voltage battery 102 may be directly charged through both the first full bridge circuit and the second full bridge circuit along a path denoted by a dotted arrow of FIG. 9. The operation for charging the high-voltage battery 102 by the bi-phase symmetric AC power received through the EMI filter 322 may be performed since the peak voltage of the voltage (Vc1) of the capacitor C1 is less than the required voltage for charging (Vbatt) of the high-voltage battery 102. Since the interleaved-inverter-type boost power factor corrector is implemented by the above-mentioned on/off combinations of the switch network, the implementation result may be responsive to the bi-phase symmetric power source used in North America.

FIG. 10 is a view illustrating on/off combinations of the switch network coping with single-phase asymmetrical power source for use in Korea and Europe. In particular, FIG. 10 is a view illustrating a method for operating the switch network when the peak voltage of the voltage (Vc1) of the capacitor C1 is greater than the required voltage for charging (Vbatt) of the high-voltage battery 102. In FIG. 10, the on/off combinations of the respective switches S1, S2, S3, S4, S5, S6, S7, S8, S9, S10, S11, BS1, BS2, and BS3 for use in the switch network are as follows.

S1:ON, S2:OFF, S3:OFF, S4:OFF, S5:OFF, S6:ON, S7:OFF, S8:OFF, S9:ON, S10:OFF, S11:ON

BS1:ON, BS2:ON, BS3:ON

The switch S1 may be turned on to connect the neutral line N to the EMI filter 322, to allow bi-phase symmetric AC power to be input to the electric vehicle through the AC power input line L1 and the neutral line N. All of the switches S2, S3, and S4 may be turned off to disconnect the AC power input lines L1, L2, and L3 from the legs 346 and 348 of the second full bridge circuit. The AC power input line L3 and the leg 346 of the second full bridge circuit may be disconnected the positive (+) electrode of the high-voltage battery 102 since the switch S5 is also turned off.

However, since the switches S6 and S11 are turned on, the leg 348 of the second full bridge circuit may be connected to the positive (+) electrode of the high-voltage battery 102. The switches S7 and S8 may be turned off and the switch S9 may be turned on. The switch S11 may also be turned on. The second full bridge circuit and the switch S7 may be connected by turning on the switch S11. In addition, the switching elements Q1 and Q6 of the boost power factor corrector 314 may be turned on.

By the above-mentioned on/off combinations of the switch network, the high-voltage battery 102 may be directly charged through the first full bridge circuit and the second full bridge circuit along a path denoted by a dotted arrow of FIG. 10. A charge voltage of the capacitor C1 may charge the high-voltage battery 102 through the first full bridge circuit and the second full bridge circuit along a path denoted by a solid arrow of FIG. 10. The operation for charging the high-voltage battery 102 may be performed since a peak voltage of the voltage (Vc1) of the capacitor C1 is greater than the required voltage for charging (Vbatt) of the high-voltage battery 102. Since the interleaved-inverter-type boost power factor corrector and the buck converter mode are implemented by the above-mentioned on/off combinations of the switch network, the implementation result may be responsive to the bi-phase symmetric power source used in North America.

FIG. 11 is a view illustrating on/off combinations of the switch network coping with three-phase symmetrical power source for use in Europe. In particular, FIG. 11 is a view illustrating a method for operating the switch network when the peak voltage of the voltage (Vc1) of the capacitor C1 is less than the required voltage for charging (Vbatt) of the high-voltage battery 102. In FIG. 11, the on/off combinations of the respective switches S1, S2, S3, S4, S5, S6, S7, S8, S9, S10, S11, BS1, BS2, and BS3 for use in the switch network are as follows.

S1:OFF, S2:ON, S3:OFF, S4:OFF, S5:OFF, S6:OFF, S7:ON, S8:ON, S9:ON, S10:OFF, S11:ON

BS1:ON, BS2:ON, BS3:ON

The switch S1 may be turned off, such that three-phase symmetric AC power may be input to the electric vehicle through the AC power input lines L1, L2, and L3. The switches S1, S3, S4, S5, S6, and S10 may be turned off, and the switches S2, S7, S8, S9, and S11 may be turned on. As a result, the AC power input line L1 may be connected to the positive (+) electrode of the high-voltage battery 102 via the switches S2, S7, S8, S9, and S11, and the leg 346 of the second full bridge circuit may be connected to the AC power input line L3. In addition, the switching elements Q1 and Q5 of the boost power factor corrector 314 may be turned on.

By the above-mentioned on/off combinations of the switch network, the high-voltage battery 102 may be directly charged through the direct path that does not pass through the full bridge circuit (bypass path) and the second full bridge circuit along a path denoted by a dotted arrow of FIG. 11. The operation for charging the high-voltage battery 102 by the three-phase symmetric AC power received through the EMI filter 322 may be performed since the peak voltage of the voltage (Vc1) of the capacitor C1 is less than the required voltage for charging (Vbatt) of the high-voltage battery 102. Since the three-leg boost power factor corrector is implemented by the above-mentioned on/off combinations of the switch network, the implementation result may be responsive to the three-phase symmetrical power source used in Europe.

FIG. 12 is a view illustrating on/off combinations of the switch network coping with three-phase symmetrical power source for use in Europe. In particular, FIG. 12 is a view illustrating a method for operating the switch network when the peak voltage of the voltage (Vc1) of the capacitor C1 is greater than the required voltage for charging (Vbatt) of the high-voltage battery 102. In FIG. 12, the on/off combinations of the respective switches S1, S2, S3, S4, S5, S6, S7, S8, S9, S10, S11, BS1, BS2, and BS3 for use in the switch network are as follows.

S1:OFF, S2:ON, S3:OFF, S4:OFF, S5:OFF, S6:ON, S7: OFF, S8:OFF, S9:ON, S10:OFF, S11:ON

BS1:ON, BS2:ON, BS3:ON

The switch S1 may be turned off, to allow three-phase symmetric AC power to be input to the electric vehicle through the AC power input lines L1, L2, and L3. The switches S1, S3, S4, S5, S7, S8, and S10 may be turned off, and the switches S2, S6, S9, and S11 may be turned on. As a result, the AC power input line L1 may be connected to the positive (+) electrode of the high-voltage battery 102 via the switches S2, S6, S9, and S11, the leg 346 of the second full bridge circuit may be connected to the AC power input line L3, and the leg 348 of the second full bridge circuit may be connected to the positive (+) electrode of the high-voltage battery 102. In addition, the switching elements Q1, Q5, and Q6 of the boost power factor corrector 314 may be turned on.

By the above-mentioned on/off combinations of the switch network, the high-voltage battery 102 may be directly charged through the second full bridge circuit along a path denoted by a dotted arrow of FIG. 12. The reason why the operation for charging the high-voltage battery 102 by the three-phase symmetric AC power received through the EMI filter 322 is performed is that the peak voltage of the voltage (Vc1) of the capacitor C1 is higher than the required voltage for charging (Vbatt) of the high-voltage battery 102. Since the three-leg boost power factor corrector and the buck converter are implemented by the above-mentioned on/off combinations of the switch network, the implementation result may cope with the three-phase symmetrical power source used in Europe.

FIG. 13 is a view illustrating on/off combinations of the switch network coping with three-phase symmetrical power source for use in Europe. In particular, FIG. 13 is a view illustrating a method for operating another switch network when the peak voltage of the voltage (Vc1) of the capacitor C1 is greater than the required voltage for charging (Vbatt) of the high-voltage battery 102. In FIG. 13, the on/off combinations of the respective switches S1, S2, S3, S4, S5, S6, S7, S8, S9, S10, S11, BS1, BS2, and BS3 for use in the switch network are as follows.

S1:ON, S2:OFF, S3:OFF, S4:OFF, S5:OFF, S6:ON, S7: OFF, S8:OFF, S9:ON, S10:OFF, S11:ON

BS1:ON, BS2:ON, BS3:ON

The switch S1 may be turned on to connect the neutral line N to the EMI filter 322, to allow bi-phase symmetric AC power to be input to the electric vehicle through the AC power input line L1 and the neutral line N. The switches S3, S4, S5, S7, S8, and S10 may be turned off, and the switches S1, S6, S9, and S11 may be turned on. As a result, the AC power input line L1 may be connected to the positive (+) electrode of the high-voltage battery 102 via the switches S1, S6, S9, and S11. In addition, the switching element Q6 of the boost power factor corrector 314 may be turned on.

By the above-mentioned on/off combinations of the switch network, the high-voltage battery 102 may be directly charged through the second full bridge circuit along a path denoted by a dotted arrow of FIG. 13. The operation for charging the high-voltage battery 102 by the three-phase symmetric AC power received through the EMI filter 322 may be performed since that the peak voltage of the voltage (Vc1) of the capacitor C1 is greater than the required voltage for charging (Vbatt) of the high-voltage battery 102. Since the single-phase full-bridge-inverter-type boost power factor corrector and an interleaved buck converter are implemented by the above-mentioned on/off combinations of the switch network, the implementation result may be responsive to the three-phase symmetrical power source used in Europe.

Figure 14:
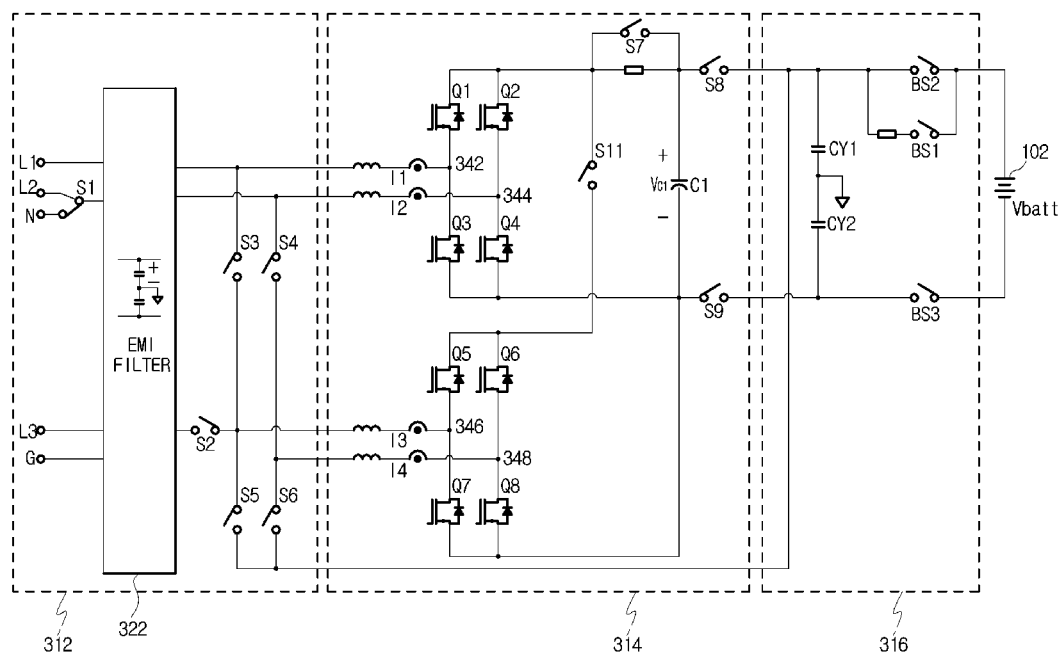
FIG. 14 is a view illustrating a first modified embodiment of the OBC according to an exemplary embodiment of the present disclosure.

FIG. 14 is a view illustrating a first modified embodiment of the OBC according to an exemplary embodiment. In the first modified embodiment of the OBC shown in FIG. 14, the switch S10 that connects the node where the leg 348 of the second full bridge circuit and the switch S4 are connected may be removed. When a single-phase boost converter is not required, the OBC 202 may have a reduced-sized and simplified structure through the structure as shown in FIG. 14.

Figure 15:
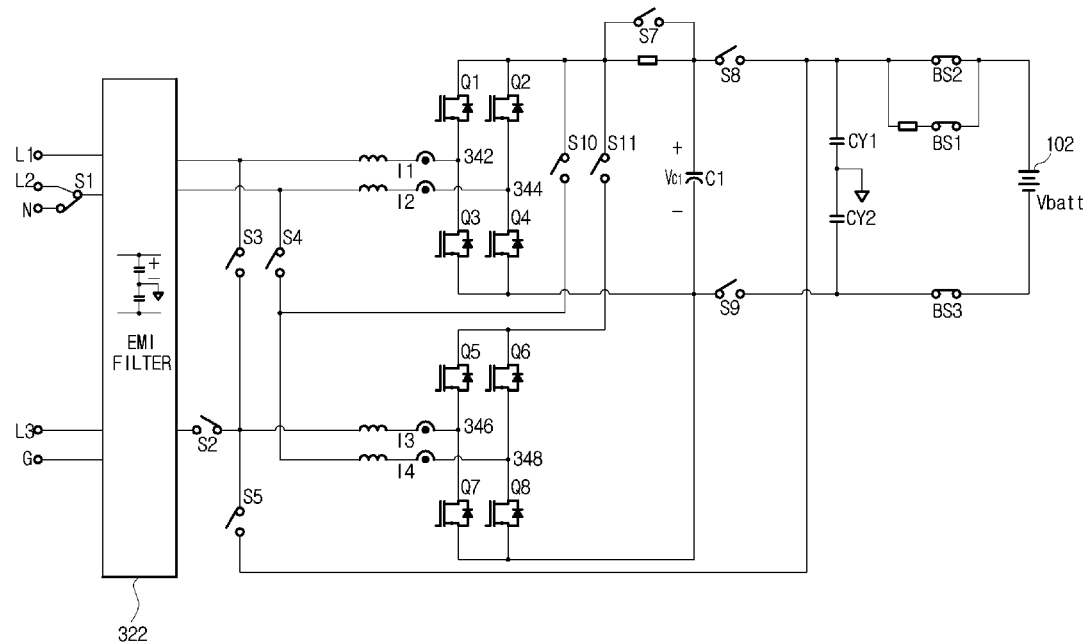
FIG. 15 is a view illustrating a second modified embodiment of the OBC according to an exemplary embodiment of the present disclosure.

FIG. 15 is a view illustrating a second modified embodiment of the OBC according to an exemplary embodiment. In the second modified embodiment of the OBC shown in FIG. 15, the switch S10 that connects the node where the leg 348 of the second full bridge circuit and the switch S4 are connected may be removed. With this structure, a single-phase full-bridge-inverter-type boost converter may be implemented.

As is apparent from the above description, the charging apparatus for the electric vehicle according to the exemplary embodiments of the present disclosure has a reduced-sized and simplified structure, and charges a battery of the electric vehicle upon receiving power from various types of power sources.

It is to be understood that the above description is only illustrative of technical ideas, and various modifications, alterations, and substitutions are possible without departing from the essential characteristics of the present disclosure. Therefore, the exemplary embodiments and the accompanying drawings described above are intended to illustrate and not limit the technical idea, and the scope of technical thought is not limited by these exemplary embodiments and accompanying drawings. The scope of which is to be construed in accordance with the following claims, and all technical ideas which are within the scope of the same should be interpreted as being included in the scope of the right.

What is claimed is:

1. A charging apparatus for an electric vehicle, comprising:
   an alternating current (AC) power input terminal configured to receive at least one AC input power between single-phase AC power and multi-phase AC power;
   a power factor corrector having a plurality of full bridge circuits configured to receive the AC input power via the AC power input terminal;
   a link capacitor configured to be charged through the power factor corrector;
   a switch network having a first switch configured to connect any one of an AC power input line and a neutral line of the AC power input terminal to the power factor corrector, and at least one second switch configured to selectively connect the AC power input terminal to the power factor corrector, or the link capacitor; and
   a controller configured to operate the power factor corrector and the switch network based on a condition of AC input power received through the AC power input terminal,
   wherein the at least one second switch includes a third switch and a fourth switch disposed to connect each of the plurality of full bridge circuits of the power factor corrector to a positive electrode of a battery.

2. The charging apparatus according to claim 1, wherein the plurality of full bridge circuits further includes:
   a first full bridge circuit and a second full bridge circuit.

3. The charging apparatus according to claim 2, wherein:
   a first leg of the first full bridge circuit is connected to a first AC power input line of the AC power input terminal; and
   a second leg of the first full bridge circuit is selectively connected to any one of a second AC power input line and a neutral line of the AC power input terminal via the first switch.

4. The charging apparatus according to claim 3, wherein:
   a first leg of the second full bridge circuit is connected to a third AC power input line of the AC power input terminal via a fifth switch; and
   a second leg of the second full bridge circuit is connected to the positive electrode of the battery via the fourth switch.

5. The charging apparatus according to claim 4, wherein the switch network further includes:
   a sixth switch disposed to connect the first leg of the first full bridge circuit and the first leg of the second full bridge circuit; and
   a seventh switch disposed to connect the second leg of the first full bridge circuit and the second leg of the second full bridge circuit.

6. The charging apparatus according to claim 5, wherein the switch network further includes:
   an eighth switch disposed to connect a node where the seventh switch and the second leg of the second full bridge circuit are connected, to an upper end of the first full bridge circuit; and
   a ninth switch disposed to connect the upper end of the first full bridge circuit and an upper end of the second full bridge circuit.

7. The charging apparatus according to claim 6, wherein the switch network further includes:
   a tenth switch and an eleventh switch disposed to connect both ends of the link capacitor to the positive electrode and a negative electrode of the battery.

8. The charging apparatus according to claim 7, wherein the switch network further includes:
   a twelfth switch disposed to connect the upper end of the first full bridge circuit and an end of the link capacitor.

9. A charging apparatus for an electric vehicle, comprising:
   an alternating current (AC) power input terminal configured to receive at least one AC input power between single-phase AC power and multi-phase AC power;
   a power factor corrector having a first full bridge circuit and a second full bridge circuit configured to receive the AC input power via the AC power input terminal;
   a link capacitor configured to be charged through the power factor corrector;
   a switch network having a first switch configured to connect any one of an AC power input line and a neutral line of the AC power input terminal to the power factor corrector, and at least one second switch configured to selectively connect the AC power input terminal to the power factor corrector, or the link capacitor; and
   a controller configured to operate the power factor corrector and the switch network according to a condition of AC input power received through the AC power input terminal,
   wherein the at least one second switch further includes a third switch and a fourth switch disposed to connect each of the plurality of full bridge circuits of the power factor corrector to a positive electrode of a battery,
   wherein:
   a first leg of the first full bridge circuit is connected to a first AC power input line of the AC power input terminal;
   a second leg of the first full bridge circuit is selectively connected to any one of a second AC power input line and a neutral line of the AC power input terminal via a first switch;
   a first leg of the second full bridge circuit is connected to a third AC power input line of the AC power input terminal via a fifth switch; and
   a second leg of the second full bridge circuit is connected to the positive electrode of the battery via the fourth switch.

10. The charging apparatus according to claim 9, wherein the switch network further includes:
    a sixth switch disposed to connect the first leg of the first full bridge circuit and the first leg of the second full bridge circuit; and a seventh switch disposed to connect the second leg of the first full bridge circuit and the second leg of the second full bridge circuit.

11. The charging apparatus according to claim 10, wherein the switch network further includes:
an eighth switch disposed to connect a node where the seventh switch and the second leg of the second full bridge circuit are connected, to an upper end of the first full bridge circuit; and
a ninth switch disposed to connect the upper end of the first full bridge circuit and an upper end of the second full bridge circuit.

12. The charging apparatus according to claim 11, wherein the switch network further includes:
a tenth switch and an eleventh switch disposed to connect both ends of the link capacitor to the positive electrode and a negative electrode of the battery.

13. The charging apparatus according to claim 12, wherein the switch network further includes:
a twelfth switch disposed to connect the upper end of the first full bridge circuit and an end of the link capacitor.

14. A charging apparatus for an electric vehicle, comprising:
an alternating current (AC) power input terminal configured to receive at least one AC input power between single-phase AC power and multi-phase AC power;
a power factor corrector having a first full bridge circuit and a second full bridge circuit configured to receive the AC input power via the AC power input terminal;
a link capacitor configured to be charged through the power factor corrector;
a switch network having a first switch configured to connect any one of an AC power input line and a neutral line of the AC power input terminal to the power factor corrector, and at least one second switch for selectively connecting the AC power input terminal to the power factor corrector, or the link capacitor; and
a controller configured to operate the power factor corrector and the switch network according to a condition of AC input power received through the AC power input terminal, wherein the at least one second switch further includes: a third switch and a fourth switch disposed to connect each of the plurality of full bridge circuits of the power factor corrector to a positive electrode of a battery,
wherein:
a first leg of the first full bridge circuit is connected to a first AC power input line of the AC power input terminal;
a second leg of the first full bridge circuit is selectively connected to any one of a second AC power input line and a neutral line of the AC power input terminal via a first switch;
a first leg of the second full bridge circuit is connected to a third AC power input line of the AC power input terminal via a fifth switch; and
a second leg of the second full bridge circuit is connected to the positive electrode of the battery via the fourth switch,
wherein the switch network further comprises:
a sixth switch disposed to connect the first leg of the first full bridge circuit and the first leg of the second full bridge circuit;
a seventh switch disposed to connect the second leg of the first full bridge circuit and the second leg of the second full bridge circuit;
an eighth switch disposed to connect a node where the seventh switch and the second leg of the second full bridge circuit are connected, to an upper end of the first full bridge circuit;
a ninth switch disposed to connect the upper end of the first full bridge circuit and an upper end of the second full bridge circuit;
a tenth switch and an eleventh switch disposed to connect both ends of the link capacitor to the positive electrode and a negative electrode of the battery; and
a twelfth switch disposed to connect the upper end of the first full bridge circuit and an end of the link capacitor.

* * * * *